United States Patent

Kyritsis et al.

[15] 3,697,204
[45] Oct. 10, 1972

[54] APPARATUS FOR INJECTION MOLDING ARTICLES OF FOAM MATERIAL

[72] Inventors: William T. Kyritsis, Beverly Farms; Robert C. Simmonds, Jr., Topsfield, both of Mass.

[73] Assignee: USM Corporation, Boston, Mass.

[22] Filed: May 7, 1970

[21] Appl. No.: 47,921

Related U.S. Application Data

[62] Division of Ser. No. 714,612, March 20, 1968, abandoned.

[52] U.S. Cl. ...................18/30 CV, 18/5 P, 264/48
[51] Int. Cl. .................................................B29f 1/04
[58] Field of Search ......18/5 P, 12 SN, 12 F, 30 AM, 18/30 AA, 30 AC, 30 AF, 30 SM, 30 SP, 30 SQ, 30 SR, 30 SS, 30 CV; 264/48, 49, 51

[56] References Cited

UNITED STATES PATENTS

| | | |
|---|---|---|
| 3,151,192 | 9/1964 | Jacobs et al. .............18/12 SN |
| 3,218,375 | 11/1965 | Hardwick .....................264/48 |
| 3,488,412 | 1/1970 | Bielfeldt et al. .........18/30 SM |

FOREIGN PATENTS OR APPLICATIONS

| | | |
|---|---|---|
| 996,102 | 6/1965 | Great Britain............18/12 SN |
| 1,432,146 | 2/1966 | France......................18/30 SR |

Primary Examiner—J. Spencer Overholser
Assistant Examiner—Norman E. Lehrer
Attorney—W. Bigelow Hall, Richard A. Wise and Scott R. Foster

[57] ABSTRACT

A method of molding articles of foam material comprising melting an injection molding material and mixing the material with a blowing agent in liquid form in a plasticator at a temperature and pressure such that the temperature is below the temperature at which the liquid foaming agent converts to a gas, and forcing the mixture through an orifice which resists the flow of the material to impart heat thereto, the heat imparted being of a magnitude sufficient to raise the temperature of the mixture to at least equal that at which the liquid foaming agent converts to a gas, and delivering the mixture, containing the gas, to a mold cavity.

An apparatus for molding articles of foam materials in accordance with the above method.

2 Claims, 1 Drawing Figure

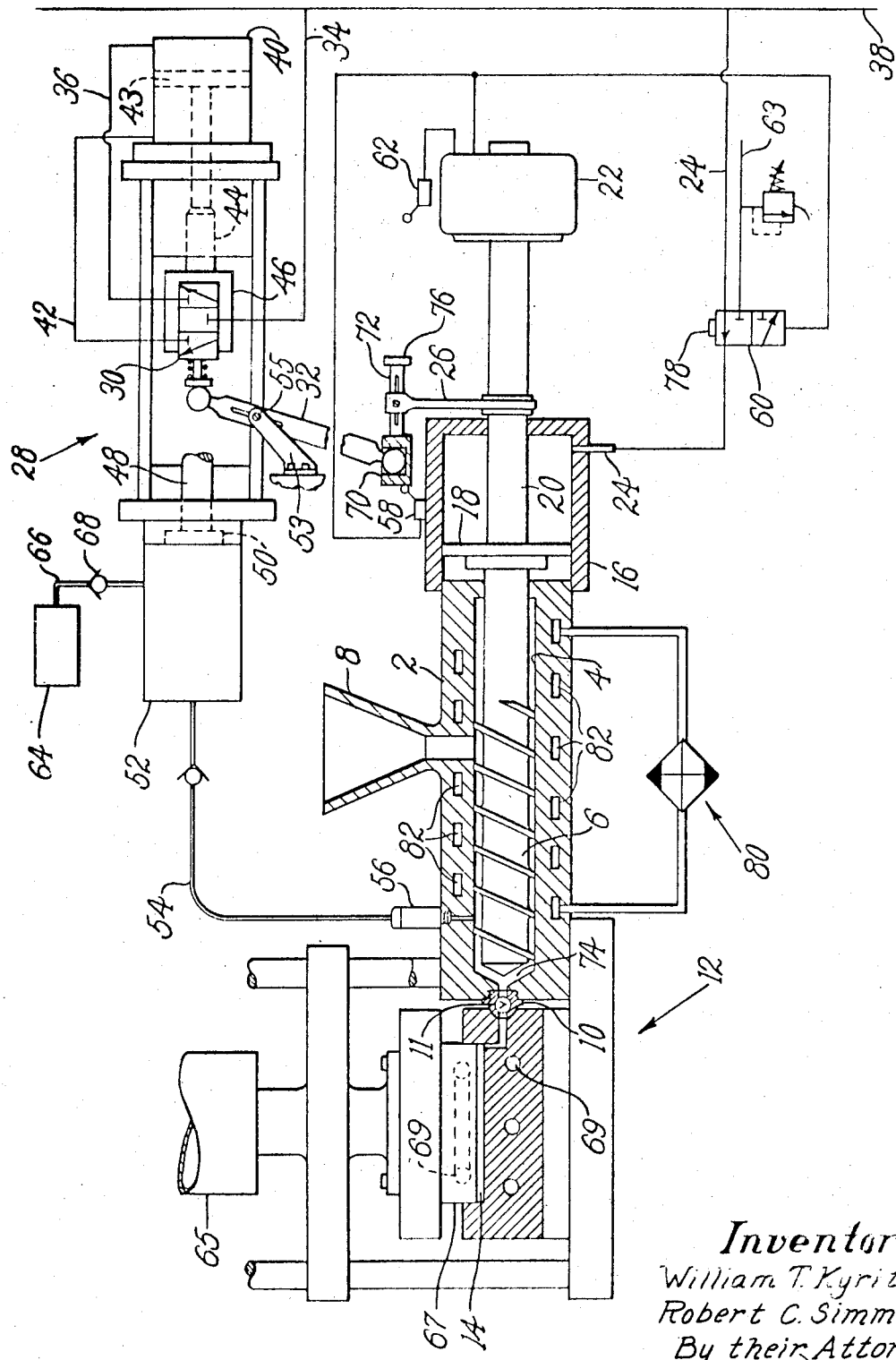

APPARATUS FOR INJECTION MOLDING ARTICLES OF FOAM MATERIAL

This is a division of application, Ser. No. 714,612, filed Mar. 20, 1968, in our names now abandoned.

BACKGROUND OF THE INVENTION

1. Field of the Invention

This invention relates to injection molding and is directed more particularly to injection molding means and method for the molding of articles of foam material.

2. Description of the Prior Art

The injection molding of foam materials is generally accomplished by melting the mixture of a foamable material and a blowing agent at a temperature sufficient to cause foaming but at a pressure above the foamable pressure of the mixture so that the mixture is prevented from foaming. Ideally, pressure is maintained on the mixture until it is delivered to a mold assembly where, upon release of the pressure, the mixture expands and fills the mold cavity.

A difficulty experienced with the above method stems from the fact that the mixture expands instantaneously with the release of pressure. Generally, expansion has taken place to a very substantial degree before the mixture is inside the mold cavity, as for example, in the conduit connecting the mold assembly and the mixture melting means.

Attempts have been made to introduce gaseous blowing agents into the injection molding material while the material is being plasticated. However, introduction of the gas is usually accompanied by a substantial degree of blowing in the plasticator, such blowing being undesirable at this stage.

Foaming of the material prior to its being in the mold cavity usually results in rather low quality cell structure in the molded article. Further, the equipment required in an injection molding machine to maintain high pressure in an attempt to control, or at least reduce, premature foaming is expensive and often difficult to maintain.

Another difficulty experienced with the usual methods of injection molding of foam materials is the irreversibility of the foaming process. Thus, once the material has been permitted to foam, it is difficult to reverse the process in order to obtain a molded object having at least a portion thereof made up of solid, substantially non-foamed, material.

SUMMARY OF THE INVENTION

It is an object of the present invention to provide a method of injection molding articles of foam material wherein the foamable mixture is maintained in a substantially non-foamed condition until it enters the mold cavity.

A further object of the invention is to provide such a method in which the foaming of the foamable material is controlled primarily by temperature rather than pressure.

Still another object of the invention is to provide such a method in which the foaming process is readily reversible so that an object may be molded partly foamed and partly solid.

A still further object of the invention is to provide an improved apparatus for injection molding articles of foamed material.

Another object of the invention is to provide such apparatus having means for maintaining the mixture of material and blowing agent in a substantially non-foamed condition until the mixture enters a mold cavity.

Another object of the invention is to provide such apparatus in which the admittance of blowing agent to the plasticator chamber is responsive to the rate of plastication in the chamber and to the amount of material being plasticated.

Still another object of the invention is to provide such apparatus having means for controlling the temperature of the mixture, whereby to control foaming of the mixture.

With the above and other objects in view, as will hereinafter appear, the present invention in one aspect thereof contemplates a method of molding articles of foamed material comprising the steps of melting a foamable material in a plasticator and mixing the material with a liquid which, when converted to gaseous form, serves as a blowing agent, the melting and mixing taking place in a plasticator at a temperature and pressure such that the temperature of the mixture is below the critical temperature at which the liquid converts to a gas and thereby causes foaming of the mixture, and forcing the resulting molten mixture into a discharge channel having means to impart heat to the mixture as it is forced through the channel. The heat imparted to the mixture is of a magnitude sufficient to raise the temperature of the liquid to its critical temperature, i.e., the point at which the liquid converts to a gaseous blowing agent. The temperature to which the mixture is raised may exceed the critical temperature of the liquid blowing agent. Communication between the channel and a mold assembly is established and the molten mixture is introduced into the mold cavity where the expansion of the mixture takes place.

In accordance with a further feature of the invention, there is provided an apparatus for molding foamed material articles comprising plasticator means for melting a foamable material and mixing the foamable material with a liquid agent which, when converted to gas, is capable of causing the material to expand, means for introducing the liquid agent into the plasticator housing, temperature control means associated with the plasticator for maintaining the mixture at a temperature below the critical temperature of the liquid agent at which the liquid converts to gas, said plasticator having a discharge channel provided with means for imparting heat to the mixture as it is forced through the channel. The heat imparted to the material flowing therethrough is sufficient to raise the temperature of the mixture to at least equal the critical temperature of the liquid agent, whereby to cause conversion of the liquid to a gaseous blowing agent so as to initiate expansion of the mixture. Mold means are provided, along with means for establishing and terminating communication between the channel and the mold means.

The above and other features of the invention, including various novel details of construction and combinations of parts, will now be more particularly described with reference to the accompanying drawings and pointed out in the claims. It will be understood that the particular method and apparatus embodying the invention is shown by way of illustration only and not as a limitation of the invention. The principles and features of the invention may be employed in various and numerous embodiments without departing from the scope of the invention.

BRIEF DESCRIPTION OF THE DRAWINGS

Reference is made to the accompanying drawing in which there is shown an illustrative embodiment of the apparatus of the present invention from which its novel features and advantages will be apparent, said drawing being a longitudinal elevational, partially sectional, partially diagrammatic view of one form of plasticator and mold assembly arrangement, in elementary form, embodying the invention, the section being taken along the centerline of the plasticator housing.

DESCRIPTION OF THE PREFERRED EMBODIMENT

Referring to the drawing, it will be seen that the apparatus of the present invention includes a plasticator housing 2 having a barrel 4 in which is disposed a rotatable and reciprocable screw 6 for plasticating an injection molding material. The plasticator housing is provided with a hopper feed inlet 8 for admitting plastic to the barrel 4, and an outlet nozzle 10, including a discharge valve 11, through which plasticated material is forced. The nozzle 10 is engageable with a mold assembly, designated generally 12, having a mold cavity 14.

Attached to the right hand end of the plasticator housing, as viewed in the drawing, is a cylinder 16 in which is disposed a piston 18 connected to an extension 20 of the screw 6. The screw extension 20 is connected to a motor 22 which serves to rotate the screw 6. The cylinder 16 is provided with a hydraulic line 24 which provides fluid to act upon the piston 18 and thereby cause lengthwise movement of the screw 6 within the barrel 4. Attached to the screw extension 20 is an arm 26 which operates a means for controlling delivery of a liquid agent to the plasticator barrel 4 responsive to the lengthwise movement of the screw 6 in the barrel, the liquid delivering means being designated generally as 28.

The liquid agent delivering means 28 includes a three position valve 30 which is acted upon by a pivotally mounted arm 32 controlled by the movement of the arm 26. As the screw 6 moves rearwardly in the plasticator housing 2, or to the right as viewed in the drawing, the arm 26 causes the arm 32 to move in a counterclockwise direction which permits the valve 30 to move off the neutral position shown in the drawing and to a position interconnecting hydraulic lines 34 and 36, the line 34 being connected to a hydraulic line 38 and the line 36 being connected to the head end of a liquid agent control cylinder 40. When the plasticator screw 6 moves forwardly, or to the left as viewed in the drawing, the arm 26 causes the arm 32 to move in a clockwise direction causing the valve 30 to move in such a manner as to interconnect the hydraulic line 34 with a hydraulic line 42 which connects with the rod end of the liquid agent control cylinder 40.

Disposed in the cylinder 40 is a piston 43 having a piston rod 44 connected thereto. The rod 44 carries a retainer block 46 in which is disposed the valve 30. The movement of the retainer block in combination with spring biasing means provide the valve 30 with a neutral-seeking tendency. Thus, except when acted upon as described herein below, the valve 30 seeks the neutral position. The rod 44 is also connected to a rod 48 which is attached to a piston 50 disposed in a liquid agent container 52. Thus, when by movement of the screw 6, the valve 30 is caused to direct fluid to the head end of the cylinder 40, the rod 48, and therefore the piston 50, are caused to move leftwardly as seen in the drawing to force liquid agent through a tube 54 to a liquid agent inlet 56 connected to the plasticator housing 2 and in communication with the barrel 4.

A pivot point 55 for the arm 32 is located on a bracket means 53 which is selectively positioned on the frame of the machine so that the ratio of movement of the upper portion of the arm to movement of the lower portion of the arm may be present as desired. Thus, the sensitivity or responsiveness of the liquid agent delivering means 28 to the movement of the screw 6 in the barrel 4 is selectively adjustable.

The arm 26 at the extreme of its forward movement actuates a switch 58 which operates a valve 60 to connect the cylinder 16 to a hydraulic line 63 of reduced pressure, thereby relieving pressure behind the piston 18, but maintaining a selected pressure on the piston whereby to maintain a selected pressure in the barrel 4. At the extreme of its rearward movement, the arm 26 causes actuation of a switch 62 which operates to shut off the motor 22.

A liquid agent reservoir 64 is connected to the container 52 by means of a line 66 having a one-way valve 68 therein.

The mold assembly 12 may be opened and closed by any known mechanism, such as a hydraulic cylinder 65 which may be operable to move one of the mold members 67 whereby to expand the mold cavity 14 after the injection of mixture thereinto. The mold assembly may also be provided with cooling means, such as conduits 69, for the conveyance of cooling fluid therethrough, for the purpose of cooling the walls of the mold cavity 14 in order to produce a molded article having a high-density exterior, or "skin," and a low-density interior, as will be described further herein below.

The operation of the apparatus will now be described with reference to the drawing which shows the plasticator screw 6 in the forward position at which it is disposed at the completion of an injection stroke. Until the screw reaches this point, the motor 22 is off and the screw 6 is not rotating. The valve 30 is in the neutral position and no liquid agent from the container 52 is entering the plasticator barrel 4. The cylinder 16 is pressurized by fluid from the line 24 flowing through the valve 60. Unplasticated material is disposed in the feed hopper 8.

Upon reaching the forwardmost position, or leftward-most position as viewed in the drawing, a block 70 disposed on a bar 72 which is connected to the arm 26 engages the switch 58 which starts the motor 22 and shifts the valve 60. Shifting of the valve 60 reduces pressure in the cylinder 16 to reduce pressure from the back surface of the piston 18. Starting the motor 22 causes rotation of the screw 6. As the screw rotates, unplasticated material in the hopper 8 is drawn into the barrel 4 and is pushed forwardly while being plasticated by the screw. As the plasticated material is pushed forwardly of the screw, such material begins to accumulate in a forward area 74 of the barrel, forcing the screw rearwardly.

Rearward movement of the screw 6 causes like movement of the arm 26 and the bar 72. As the block 70 is moved rearwardly with the arm 26, the arm 32 is caused to rotate in a counterclockwise direction, permitting shifting of the valve 30 so that the hydraulic lines 34 and 36 are interconnected and pressure is put upon the head end of the piston 43 in the liquid agent control cylinder 40. Consequent movement of the piston 43 moves the rods 44 and 48 forwardly. Forward movement of the rod 48 causes like movement of the piston 50 which forces liquid agent from the container 52 through the tube 54 and into the barrel 4 by way of the liquid agent inlet 56. Thus, as the screw is moved rearwardly and newly plasticated material is accumulated in the barrel 4, liquid agent is fed into the barrel to be mixed with the plasticated material. The more rapid the backward movement of the screw 6, the more rapid the injection of blowing agent into the barrel 4; further, the greater the volume of injection molding material being plasticized, the greater the volume of liquid blowing agent admitted to the barrel or plasticating chamber, because of the greater length of travel of the screw and therefore of the arms 26, 32. Thus, the rate of blowing agent admittance and the volume of blowing agent admittance is responsive to the rate and volume of plastication in the barrel. The degree to which it is responsive may be selectively determined by setting of the pivot point 55 along the arm 32.

As the screw 6 approaches the end of its rearward stroke, a lug 76 carried by the bar 72 engages and operates the switch 62 which causes the motor 22 to stop operating thereby terminating rotation of the screw. The valve 30 shifts to the neutral position whereby to stop the injection of liquid agent into the plasticator barrel. The apparatus is now in condition for an injection stroke.

The mold assembly 12 is caused to engage the outlet nozzle 10 by means known in the art, which operates the valve 11 whereby to place the mold cavity 14 in communication with the plasticator barrel 4. A manual start button 78 may be used to shift the valve 60 to pressurize the cylinder 16. Alternatively, the valve 60 may be shifted by automatic means, such as for example by the switch 62, so that manual operation is not necessary. In either case, upon shifting of the valve 60 the piston 18 is driven forwardly in the cylinder 16 whereby to drive the screw 6 forwardly in the barrel 4 to force molten plastic through the nozzle 10 and into the mold assembly 12. As the screw moves forwardly, the arm 32 is caused to rotate in a clockwise direction shifting the valve 30 to the first position which interconnects the hydraulic lines 34 and 42 whereby to pressurize the rod end of the liquid agent control cylinder 40. The rods 44 and 48 accordingly move rearwardly whereby to move the piston 50 rearwardly in the container 52 to draw in liquid agent from the liquid agent reservoir 64 through the line 66 and the one-way valve 68. Movement of the rod 44 and the retainer block 46 operates to permit shifting of the valve 30 back to its neutral position.

The screw rides forwardly until the block 70 engages the switch 58 to start the motor 22 and again shift the valve 60 to start another cycle of operation.

To insure that the mixture of plasticated material and liquid agent in the barrel do not reach critical temperature before the extrusion thereof through the nozzle 10, a temperature control system, designated generally as 80, is utilized and includes fluid channels 82 in the plasticator housing 2.

After the mixture of injection molding material and liquid blowing agent has been forced through the nozzle 10 whereby to raise the temperature of the mixture and to convert the liquid agent to a gas, and after the mixture has been forced into the mold cavity 14, it may be desirable to reverse the blowing process so that a portion of the molded object is molded of solid plastic, as opposed to foamed plastic. For example, if it is desired that the molded article have a solid plastic outer skin and a less dense foamed interior, the cooling of the walls of the mold cavity, as by the flow of cooling fluid through the channels 69, may be utilized to reduce the temperature at the surface area to below the critical temperature whereby to convert the gaseous blowing agent in the surface areas back to liquid which is dispersed in the molding material and does not deleteriously affect the molding of a solid outer skin. The temperature in the interior of the molding, however, remains above the critical temperature of the blowing agent so that the interior of the molded object remains of a foamed nature while the exterior is converted to solid.

The liquid agent used may be, for example, liquid Freon, $CO_2$, or pentane. The selection of the liquid agent depends to a large extent upon the material being molded and the operating conditions.

The molding material may be polyvinylchloride or any other plastic suitable for injection foam molding. For the purposes of this description, the term "plastic" is used in a broad sense, encompassing true plastics, natural and synthetic rubbers, and other suitable molding materials of a plastic-like nature but which may not, for all purposes, be classed technically as plastics.

Having thus described our invention, what we claim as new and desire to secure by Letters Patent of the United States is:

1. Apparatus for injection molding foam material comprising a chamber in which thermoplastic molding material is melted, reciprocating means for mixing and melting said material in said chamber and movable in one direction as the material is melted, said reciprocating means being movable in the opposite direction to discharge the melted material from the chamber, means for introducing blowing agent in liquid form into said chamber for mixing with the melted material by the reciprocating means, means responsive to the rate and extent of movement of the reciprocating means in said one direction for causing said introducing means to introduce said blowing agent at a rate and volume proportionally related to the rate and volume of the melting of said material, means for maintaining the temperature and pressure in said chamber during said mixing such that said temperature is below the temperature at which the liquid blowing agent converts to gas, and a passage through which the mixed melted material and blowing agent is discharged, said passage having means for heating the mixture as it is discharged for causing the foaming agent to convert to a gas.

2. Apparatus according to claim 1 and provided with a mold having an expandable cavity into which the mixture is discharged when the mold cavity is in a low volume condition and means for cooling the mold cavity to a temperature at which the gaseous blowing agent converts to liquid form so a non-foamed skin is formed on the material contacting the cavity surface, means effective after the skin is formed for expanding the mold cavity whereby the mixture of material and gaseous blowing agent away from the mold surface foams to the extent permitted by the expanding cavity.

* * * * *